United States Patent [19]

Hayase et al.

[11] 4,108,300
[45] Aug. 22, 1978

[54] BAG PACKING APPARATUS

[75] Inventors: Masao Hayase, Kasugai; Kazunori Araki, Gifu, both of Japan

[73] Assignee: Mitsubishi Jukogyo Kabushiki Kaisha, Tokyo, Japan

[21] Appl. No.: 823,450

[22] Filed: Aug. 10, 1977

[51] Int. Cl.² .................... B65G 19/02; B65B 43/30
[52] U.S. Cl. ...................... 198/479; 53/187; 53/384; 53/386; 198/626; 198/653; 198/695
[58] Field of Search .............. 53/384, 187, 386; 198/479, 626, 653, 695; 226/173

[56] References Cited

U.S. PATENT DOCUMENTS

| 3,246,816 | 4/1966 | Dexter et al. | 198/694 X |
| 3,568,402 | 3/1971 | Lense et al. | 53/384 |
| 3,955,334 | 5/1976 | Wild et al. | 53/384 X |

*Primary Examiner*—Travis S. McGehee
*Attorney, Agent, or Firm*—Wenderoth, Lind & Ponack

[57] ABSTRACT

In a bag packing apparatus, a plurality of bags are successively conveyed at a predetermined interval in the direction of the thickness of the bags, rather than in the direction of the width of the bags, by means of a pair of chain conveyors disposed along the opposite sides of the conveying path of the bags. A plurality of clamps are supported by the pair of conveyors at equal intervals and are adapted to grip the opposite ends of the mouths of the respective bags. There is provided means for moving the respective clamps back and forth at right angles to the direction of traveling of the conveyors to facilitate opening and closing of the mouths of the respective bags for packing the bags.

1 Claim, 8 Drawing Figures

U.S. Patent    Aug. 22, 1978    Sheet 1 of 4    4,108,300

BAG PACKING APPARATUS

BACKGROUND OF THE INVENTION

The present invention relates in general to a bag packing apparatus, and more particularly, an apparatus for automatically opening, packing and sealing, successively, conveyed paper or plastic bags or the like.

In a heretofore known bag packing apparatus as shown in FIG. 1, wherein three-sided sealed bags 1, made of paper or plastic films with mouths 2 along their top edge, are charged with contents by means of a charging device 3 and tightly sealed 4, it was a common practice to convey the bags 1 successively in the direction of their width by means of chain conveyors 5. However, such apparatuses in the prior art have the following shortcomings, and consequently, many problems remain unsolved for establishing common availability for different bag sizes and for speeding up processing capability. For example, when the sidth of the bags changed it was necessary to change the mounting distance in the widthwise direction between the bag gripping claws 6 within the conveyor pitch $P_1$ for each attachment. This resulted in a very complex structure and adjustment requirements for the machine; size change was not easy. In addition, in order to enhance the processing capability, the conveying speed had to be raised to a higher speed due to the fact that the bags were conveyed in the widthwise direction, and especially when the contents of the bags were liquid, there was a disadvantage in that the liquid would squeeze out of the top edge of the bag due to acceleration, resulting in further adverse effects upon sealing.

SUMMARY OF THE INVENTION

Therefore, it is one object of the present invention to provide an improved bag packing apparatus which is free from the above-mentioned disadvantages.

According to one feature of the present invention, a bag packing apparatus is provided which has a pair of chain conveyors for conveying bags in the direction of their thickness, clamps supported by the respective conveyors for gripping the opposite ends of the mouths of the respective bags, and means for moving said clamps forward and backward at right angles to the direction of movement of the chain conveyors.

According to the above-featured invention, since the bags are conveyed in the direction of their thickness, the conveying pitch of the bags can be decreased and also the conveying speed can be reduced. Furthermore because that the opposite ends of the mouths of the bags are gripped by the clamps, squeezing of the contents of the bags caused by acceleration can be mitigated by tilting of the lower portions of the bags.

BRIEF DESCRIPTION OF THE DRAWING

The above-mentioned and other features and objects of the invention will become more apparent by reference to the following description taken in conjunction with the accompanying drawings, in which.

DETAILED DESCRIPTION OF THE INVENTION

Figure 2:
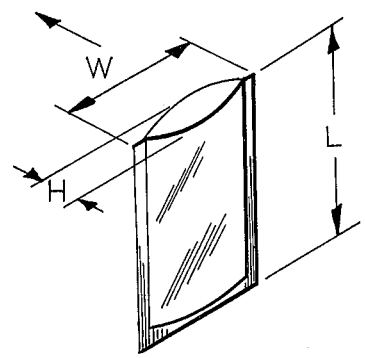
FIG. 2 is a schematic perspective view of a type of bag to be used for bag packing.

Referring now to FIG. 2 of the drawings, a bag 1 made of a laminated plastic sheet to be handled in the apparatus according to the present invention is shown. This bag 1 has three sides, a left, a right and a bottom side preliminarily heat-sealed so that only the top side thereof can be opened.

Figure 3:
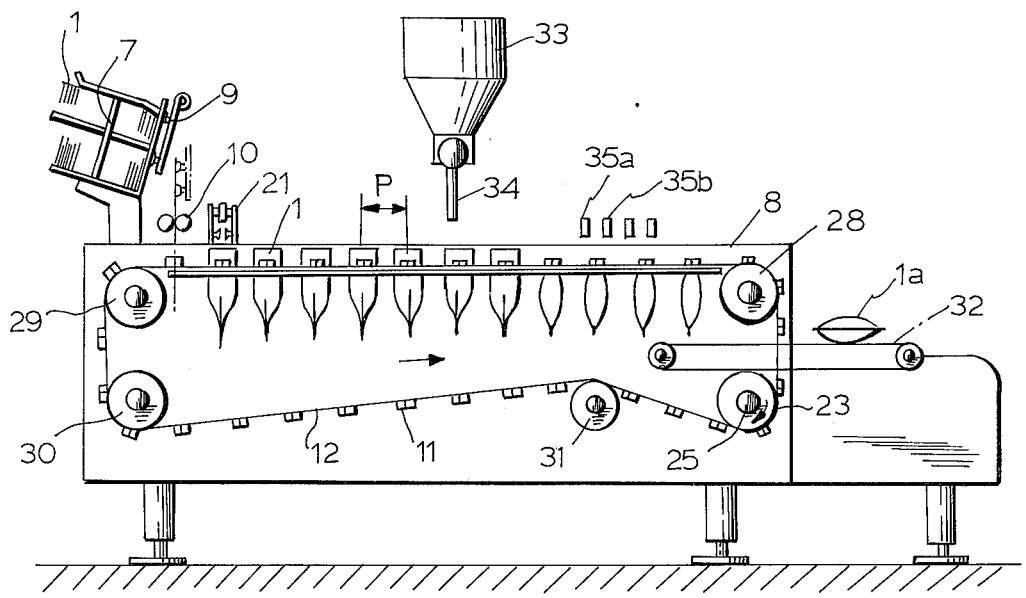
FIG. 3 is a front view showing one preferred embodiment of the bag packing apparatus according to the present invention.

With reference to the front view in FIG. 3, reference numeral 7 designates an empty bag magazine for stacking empty bags 1, which is fixedly supported from a main body frame 8. Numeral 9 designates known suction cups for taking the bags 1 one by one from the magazine 7. The suction cups are adapted to descend along a double-dot chain line after they have removed each bag 1 one by one and thereby convey each bag to delivery rollers 10. The delivery rollers 10 rotate continuously to deliver each empty bag 1 to a predetermined position of bag gripping claws 11. There is a mechanical timing means for making the bag gripping claws 11 mounted on chain conveyors 12, 12 (the conveyors consisting of a pair of roller chains) stop at a predetermined position right under the contact line between the rollers 10 when the empty bag 1 is delivered to that predetermined position.

The bag gripping claws 11 are composed of parts 11a to 11g. A movable claw 11a moves about a pin 11d against a resilient force of a compression spring 11c, and a fixed claw 11b is fixedly mounted on a slide block 11f together with a roller 11g by means of a bolt 11e. The slide block 11f is slidably supported on a rod-shaped attachment 13 of the chain conveyor 12. The empty bag 1 is gripped between the movable claw 11a and the fixed claw 11b by the resilient force of the compression spring 11c. Reference numerals 14 and 15 designate rails for guiding the chain conveyors 12, and numerals 16 and 17 designate guide rails for guiding the roller 11g.

A pusher device 18 moves the gripping claws 11 in accordance with the geometrical decrease of the size W of the bag in FIG. 2 which occurs when the top mouth of the empty bag 1 is opened. The pusher device 18 moves the gripping claws 11 by moving the roller 11g and is integrally formed with a regulating table 19 which is integral with the rail 15. The piston rod of the pusher device 18 is adapted to be guided by the rail 15. Reference numerals 20, 20 designate vacuum suction cups for opening the top of the bag 1 for purpose of charging the bag 1 with the contents. The vacuum suction cups are mounted on levers 21, 21, which are in turn rockable about a fulcrum on a support shaft 22 in accordance with the opening state of the bag 1. The support shaft 22 is supported from the main body 8 in a vertically slidable manner, and the vacuum suction cups 20 are so composed that the vertical movement and the bag opening operation may be effected thereby. The gripping claws 11 are mounted on the rod-shaped attachment 13 of the chain conveyor 12 at a fixed pitch, and the chain conveyor 12 is conveyed by a drive sprocket 23 in the direction of advance as indicated by an arrow in FIG. 3, the conveying distance (one pitch being equal to P (FIG. 3)). The movement of the chain conveyors 12 is intermittent, and in the illustrated positions they are stopped. The drive sprocket 23 is rotated through a shaft 25 by an indexing device 24, while the input shaft of the indexing device 24 is connected via coupling means 27 to a power source such as a motor 26 or the like supported from the main body frame.

Reference numerals 28, 29, 30 and 31 designate drive sprockets, numeral 32 designates a delivery belt for delivering a bagged product 1a which was packed with the contents and which had its top side sealed, and numeral 33 designates a charging device provided with a hopper for charging the contents to be packed, which is a known device adapted to charge a predetermined amount of contents from above of an opened bag through a nozzle 34. Reference numerals 35a and 35b designate rectangular seal members for sealing the top end of the bag after it has been charged with the contents, and the method for sealing is a well-known method, for example, a method in which heated rectangular seal members 35a and 35b are disposed so as to oppose a predetermined position of the top end portion of the bag and are pressed against the bag with a predetermined pressure and at a predetermined temperature to tightly seal the top end portion. The regulating table 19 serves to support the rails 14 and 15 from the main body frame 8, and it has a structure adapted to displace and support the members associated to the gripping claws 11 in accordance with the size of width of the bags 1.

Figure 1:
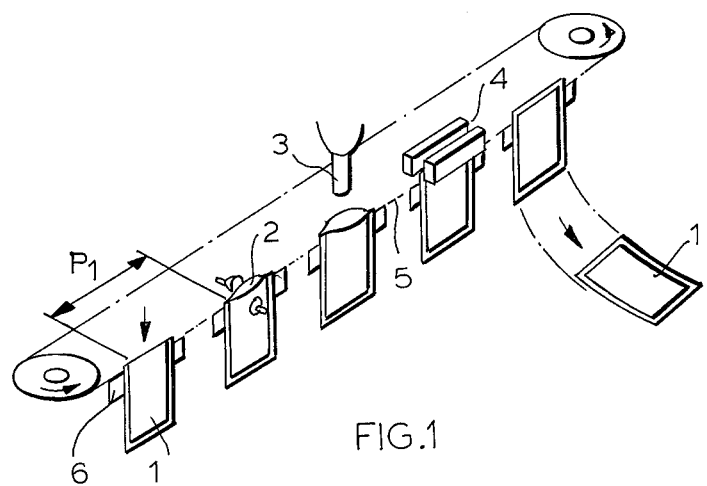
FIG. 1 is a schematic perspective view showing bags being conveyed in a bag packing apparatus of the prior art type.
Figure 4:
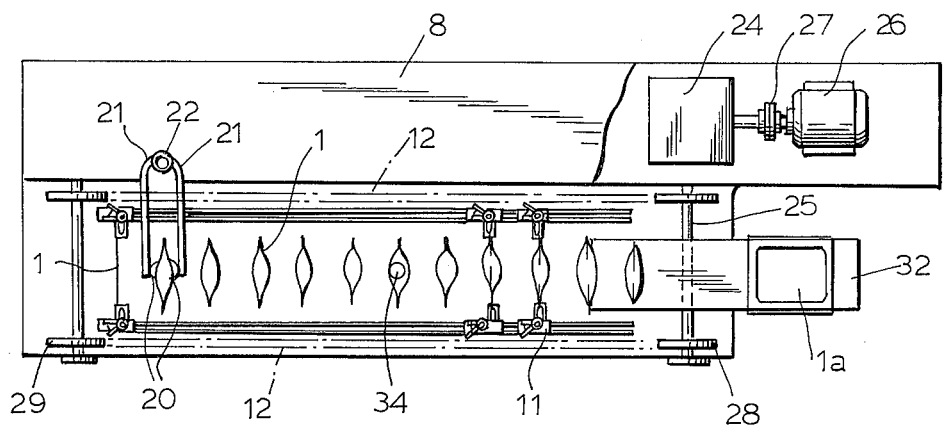
FIG. 4 is a plan view of the same apparatus.
Figure 6:
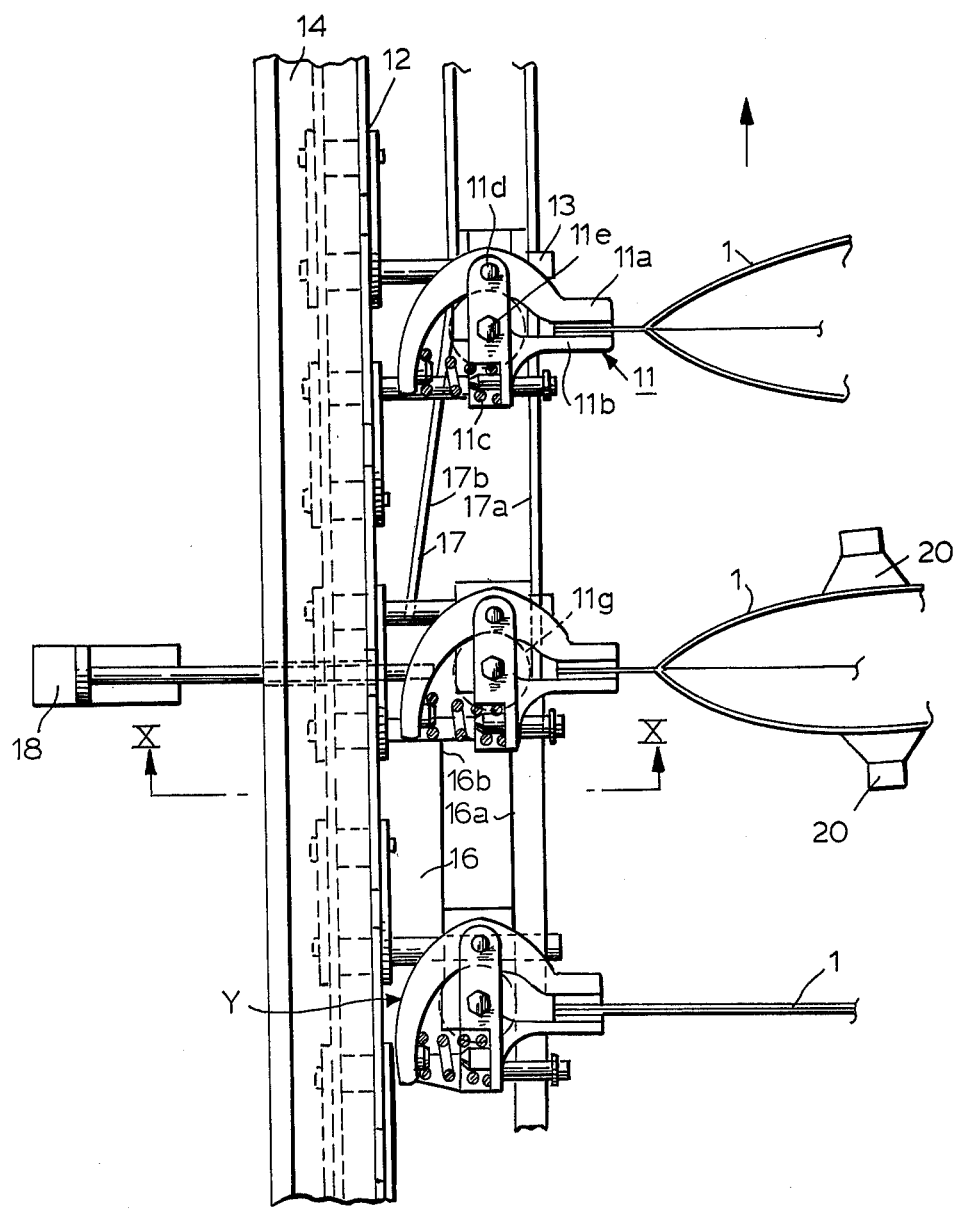
FIG. 6 is an enlarged plan view showing details of a bag gripping section of the apparatus.

Explaining now the operation of the apparatus, the empty bags 1 are removed one by one by means of the vacuum suction cups 9 and fed to the delivery roller 10 as shown by the chain line in FIG. 3. The bag 1 is delivered to a predetermined position between the movable claw 11a and the fixed claw 11b of the gripping claws 11 by means of the roller 10. Upon the delivery of the bag 1 to the gripping claws 11, the chain conveyors 12 are stopped, and when the bag 1 is delivered, the interval between the movable claw 11a and the fixed claw 11b is opened a predetermined distance by means of a separate device (not shown) for pressing the movable claw 11a in the proximity of the portion marked Y in FIG. 6 while compressing the spring 11c. Subsequently, the chain conveyors 12 move a distance P, and after they have stopped, opening of the bag is effected by means of the suction cups 20. In this bag opening operation, with regard to the operation timing, the suction cups 20 and the pusher device 18 are synchronized with each other. More particularly, the timing when the suction cups 20 are effecting the bag opening operation and the timing when the pusher device 18 pushes the roller 11g of the clamping claws 11 are synchronized. Thereafter, the bag 1 maintains its opened state owing to the rigidity of the material of the bag until it is conveyed to the position under the nozzle 34 of the charging device 33, where it stops and is charged with the contents. After charging, the bag 1 is tightly sealed by the rectangular seal members 35a and 35b. More particularly, the rectangular seal members 35a and 35b tightly seal the mouth portion of the bag through the operation steps of descending, pressure sealing (closing), retracting (opening) and ascending. In this process also, the chain conveyors 12 are kept stopped and the bag stops, too. Then the bag is made to fall onto a delivery belt 32 by opening the gripping claws 11, and the bag is delivered out of the machine in a state of a bagged product 1a. It is to be noted that at the station for the sealing device, the top side of the bag charged with the contents is gripped in such a manner that the top edge may be stretched by the opposite gripping claws 11 by shifting the gripping claws 11 outwardly in the direction of the width W of the bag 1 with the tilted portion of the guide rail 17. At this moment the top edge of the bag takes a closed configuration. According to the present invention, as will be seen from the preferred embodiment shown in FIG. 4, the direction of movement of the bags 1 is not in the widthwise direction W of the bag (as is the case with the prior art method shown in FIG. 1), but is in the direction of thickness H of the bag. In addition, since the location of the gripping claws 11 for the bag 1 is near the top end portion of the bag, when the bag moves intermittently with the contents charged therein the lower portion of the bag 1 will tilt in the direction of advance or in the opposite direction as affected by positive or negative acceleration.

Figure 5:
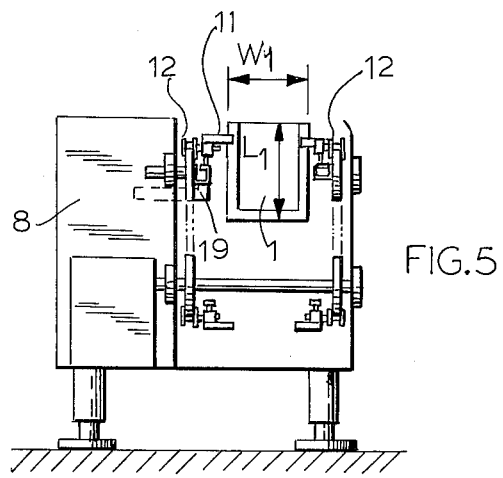
FIG. 5 is a side view of the same.
Figure 7:
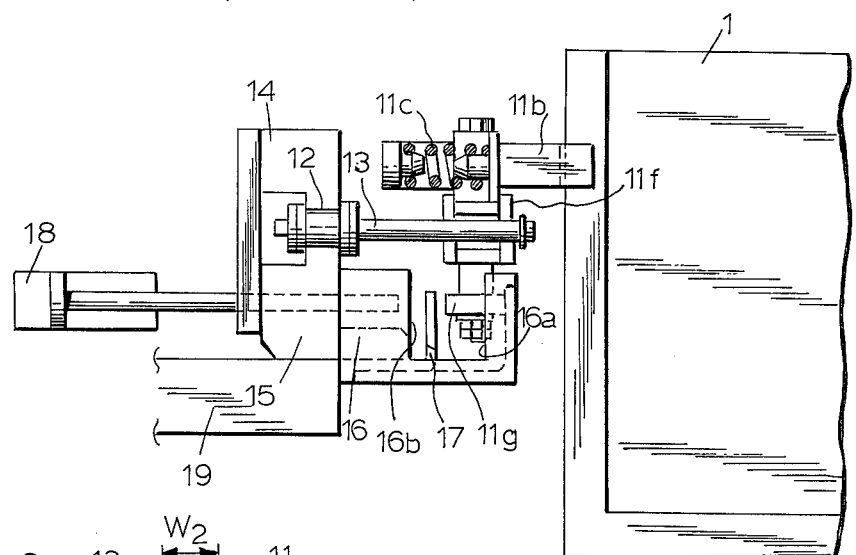
FIG. 7 is a cross-section view taken along line X—X in FIG. 6.
Figure 8:
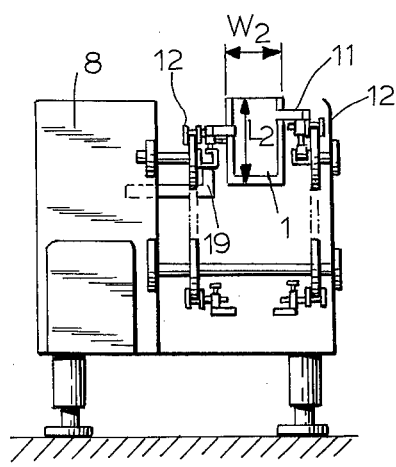
FIG. 8 is a side view explaining the mode of size change of the apparatus.

Furthermore, when the apparatus is used in common for different sizes of bags, the common use can be achieved by changing the size of width W from $W_1$ to $W_2$, that is, by changing the state of the apparatus from that shown in FIG. 5 to that shown in FIG. 8, and this change can be effected easily by moving the members associated with the gripping claws 11.

As fully described above, according to the present invention, the bags are conveyed in the direction of thickness H owing to the fact that there are provided a pair of chain conveyors which convey the bags in the direction of their thickness, and thus the conveying pitch of the bags (the interval between a bag and an adjacent bag) can be reduced, so that the conveying speed and acceleration can be widely reduced in comparison to the prior art machines having the same capability. In addition, since the opposite ends of the mouth of the bag are gripped by the clamps, the squeeze out of the contents caused by the effect of the acceleration can be prevented by appropriate tilting of the lower portion of the bag. Furthermore, since the gripping of the mouth of the bag is effected by means of a clamp system, changing the size of the bags can be effected in a simple manner by means of the members associated with the clamps.

Since many changes could be made in the above construction and many apparently widely different embodiments of this invention could be made without departing the scope thereof, it is intended that all matter contained in the above description or shown in the accompanying drawings shall be interpreted as illustrative and not as a limitation to the scope of the invention.

What is claimed is:

1. An apparatus for packing bags comprising:
   a pair of horizontally-spaced, parallel chain conveyors;
   a plurality of paired attachement-rods positioned opposite each other on said chain conveyors and projecting toward each other;
   clamping means slidably mounted on said attachment-rods for clamping and holding the sides of said bags between said conveyors; and
   guide means adjacent said clamping means for sliding said clamping means on said attachment-rods toward and away from said conveyors.

* * * * *